(12) United States Patent
Wendt

(10) Patent No.: US 10,978,860 B1
(45) Date of Patent: Apr. 13, 2021

(54) MOTOR-DRIVEN HAND TOOL FOR CUTTING CABLE CLADDING

(71) Applicant: Steven Wendt, Glassboro, NJ (US)

(72) Inventor: Steven Wendt, Glassboro, NJ (US)

(*) Notice: Subject to any disclaimer, the term of this patent is extended or adjusted under 35 U.S.C. 154(b) by 0 days.

(21) Appl. No.: 16/808,684

(22) Filed: Mar. 4, 2020

(51) Int. Cl.
*H02G 1/12* (2006.01)
*B23D 45/16* (2006.01)
*B23D 45/00* (2006.01)

(52) U.S. Cl.
CPC ......... *H02G 1/1217* (2013.01); *B23D 45/003* (2013.01); *B23D 45/16* (2013.01)

(58) Field of Classification Search
CPC ...... H02G 1/1217; H02G 1/12; H02G 1/1204; H02G 1/1239; H02G 1/1207; H02G 1/1212; B23D 45/003; B23D 45/16; H01L 315/00; H01L 315/006; H01L 315/005
USPC ......... 30/90.1–90.9, 91.1, 91.2; 81/9.4, 9.41, 81/9.42, 9.43, 9.44, 9.51
See application file for complete search history.

(56) References Cited

U.S. PATENT DOCUMENTS

| | | | |
|---|---|---|---|
| 3,851,387 A | 12/1974 | Ducret | |
| 4,062,110 A | 12/1977 | Alvarez | |
| 4,142,290 A | 3/1979 | Ducret | |
| 4,267,636 A * | 5/1981 | Ducret | H02G 1/1297 30/90.3 |
| 4,359,819 A | 11/1982 | Ducret | |
| 4,972,583 A * | 11/1990 | Pinchon | H02G 1/1229 30/90.6 |
| 5,070,615 A * | 12/1991 | Michael, III | H02G 1/1297 30/90.8 |
| 6,079,105 A | 6/2000 | Hollingsworth | |
| 6,311,600 B1 | 11/2001 | Lo et al. | |
| 9,153,364 B2 | 10/2015 | Parker | |
| 10,033,167 B1 * | 7/2018 | DeVita | H02G 1/1239 |
| 2019/0267780 A1 * | 8/2019 | Smith | H02G 1/005 |

* cited by examiner

*Primary Examiner* — Phong H Nguyen
(74) *Attorney, Agent, or Firm* — Thomas J. Germinario

(57) ABSTRACT

The present invention is a portable hand tool for cutting the metal cladding of an electrical cable. The basic structure of the tool is a spring-loaded clamp comprising two opposing jaws which are biased toward closure by a torsion spring-loaded hinge mechanism. The upper jaw contains a rotating circular saw blade driven by a battery-powered electric motor, while the lower jaw contains a channel into which the cable is inserted. Application of manual pressure to the handle extensions of the two jaws has the dual effect of separating the jaws, so that the blade is raised away from contact with the cable cladding, and cutting off power to the motor, thereby stopping the blade rotation. With the blade raised and motionless, the operator can safely replace or re-position the cable in the lower jaw.

6 Claims, 4 Drawing Sheets

MOTOR-DRIVEN HAND TOOL FOR CUTTING CABLE CLADDING

FIELD OF INVENTION

The present invention relates to the general field of hand tools, and more specifically to hand tools which incorporate one or more rotating saw blades.

BACKGROUND OF THE INVENTION

The metal cladding of electrical conduits such as BX cable is difficult to cut due to its hardness and shape. Maintaining a proper alignment of the cutter blade to the cladding is essential to avoid injuries and/or severing the cable wires beneath the cladding. A hand tool designed for this task must be able to simultaneously retain the cable in a fixed position and control the blade position so that it does not penetrate below the cladding and so that it does not interfere with the positioning of the cable. In both of these aspects, the present invention is superior to the prior art, insofar as the motor-driven blade rotation is halted and the blade is lifted away from the cable while it is being inserted into the tool.

SUMMARY OF THE INVENTION

The present invention is a portable hand tool for cutting the metal cladding of an electrical cable. The basic structure of the tool is a spring-loaded clamp comprising two opposing jaws which are biased toward closure by a torsion spring-loaded hinge mechanism. The upper jaw contains a rotating circular saw blade driven by a battery-powered electric motor, while the lower jaw contains a channel into which the cable is inserted. Application of manual pressure to the handle extensions of the two jaws has the dual effect of separating the jaws, so that the blade is raised away from contact with the cable cladding, and cutting off power to the motor, thereby stopping the blade rotation. With the blade raised and motionless, the operator can safely replace or re-position the cable in the lower jaw.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
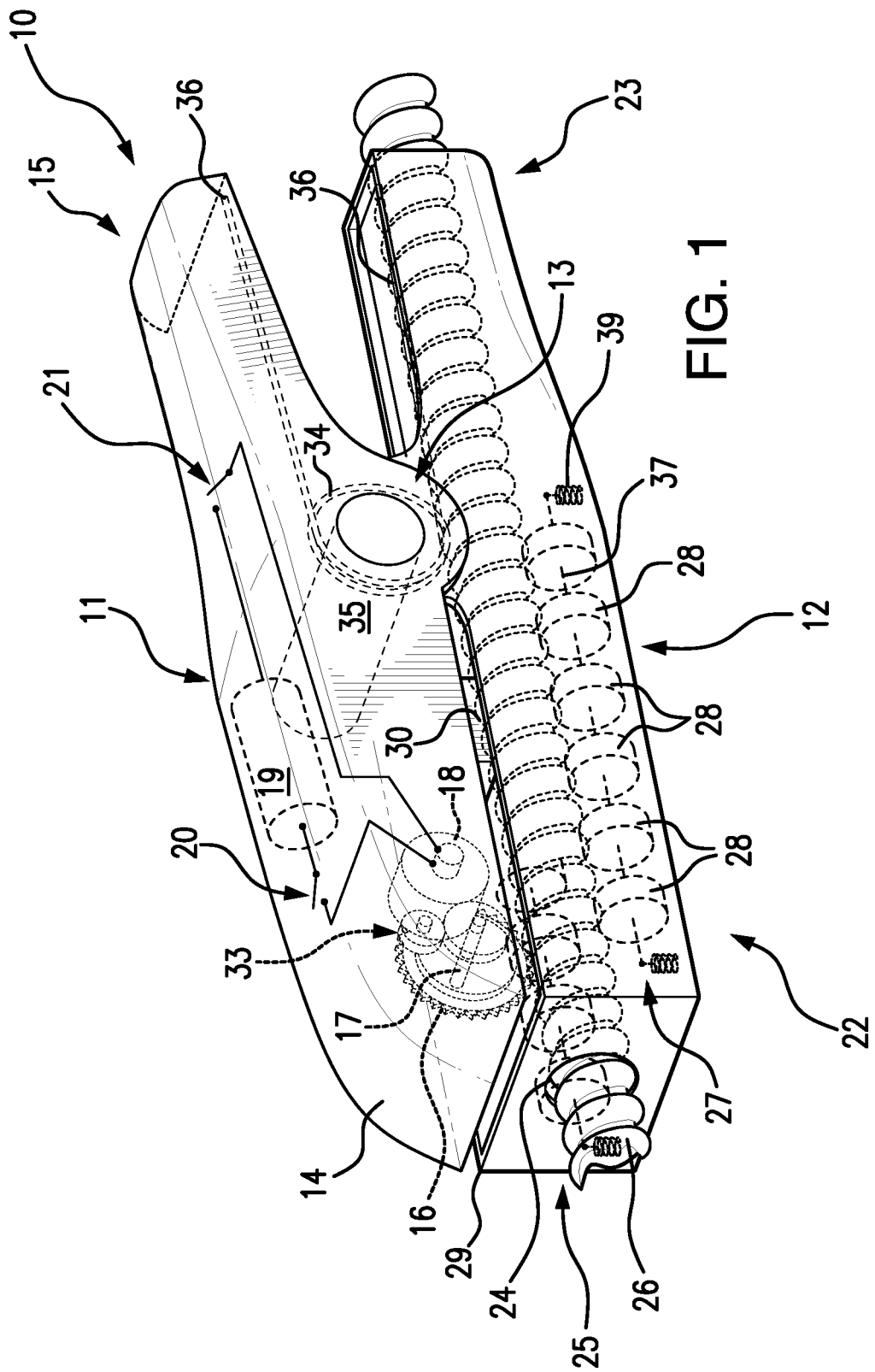
FIG. 1 is a perspective, partial cutaway view of the preferred embodiment of the present invention.
Figure 2:
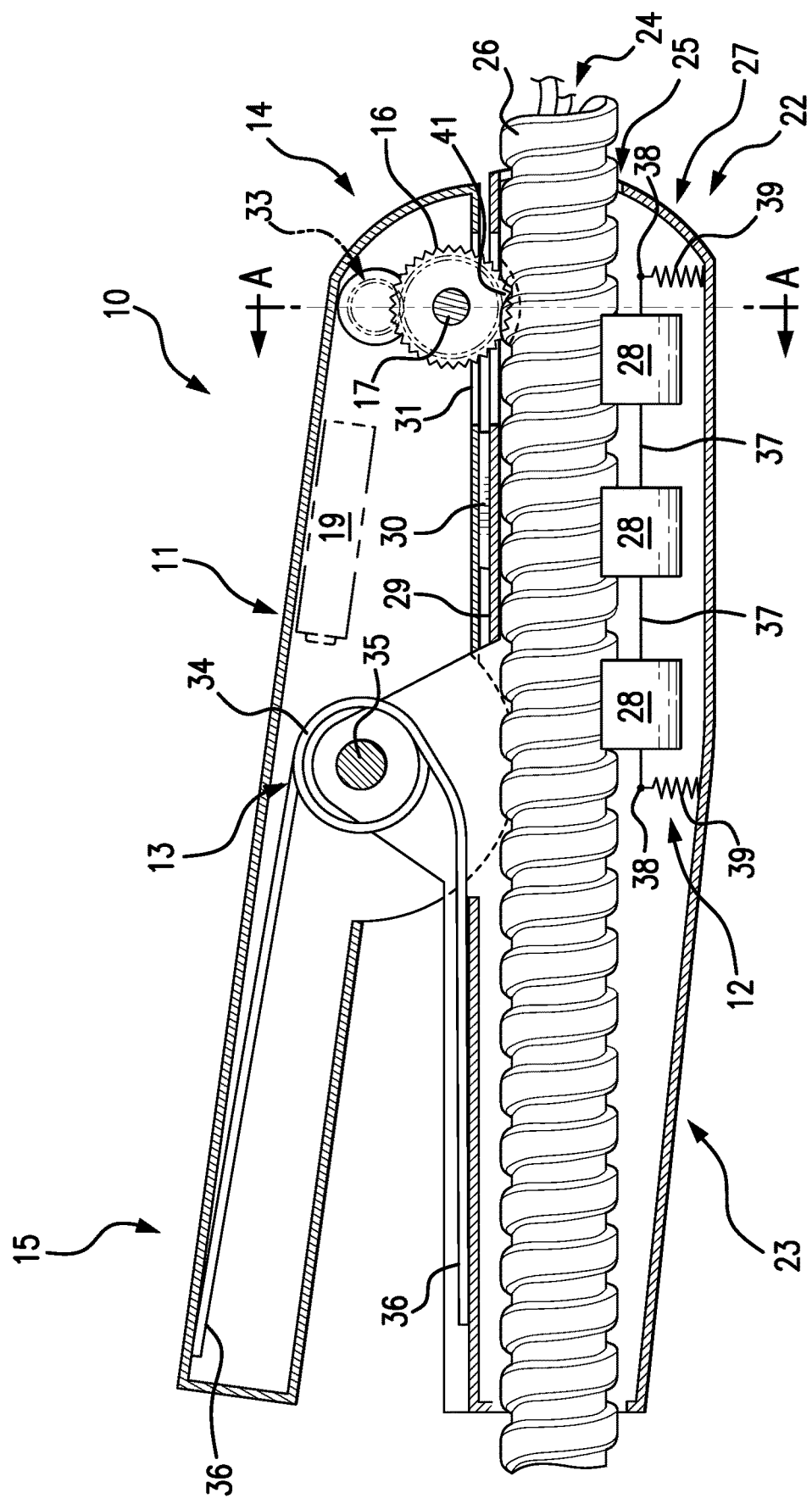
FIG. 2 is a side profile, partial cutaway view of the preferred embodiment of the present invention in the clamped position.
Figure 3:
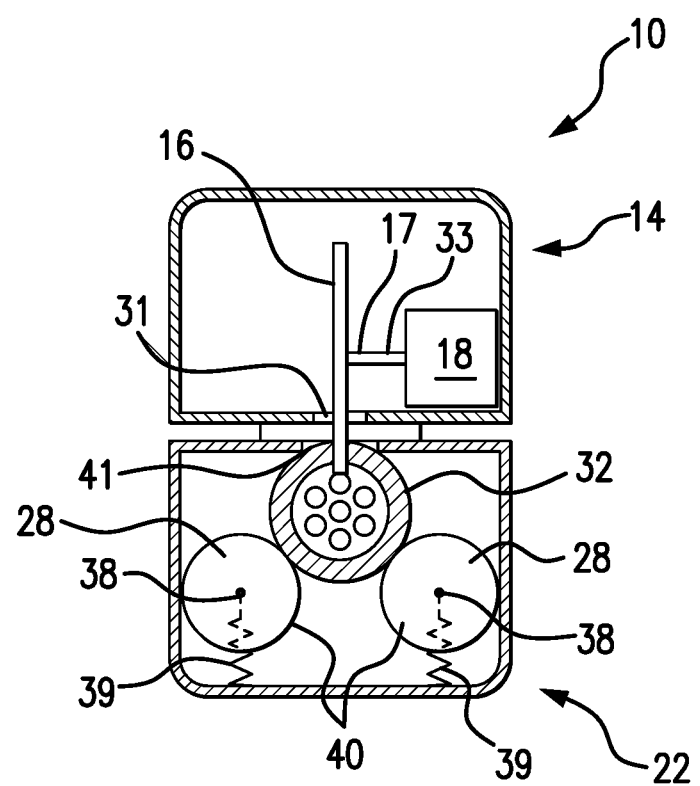
FIG. 3 is a cross-section view, along the line A-A' in FIG. 2, of the preferred embodiment of the present invention.
Figure 4:
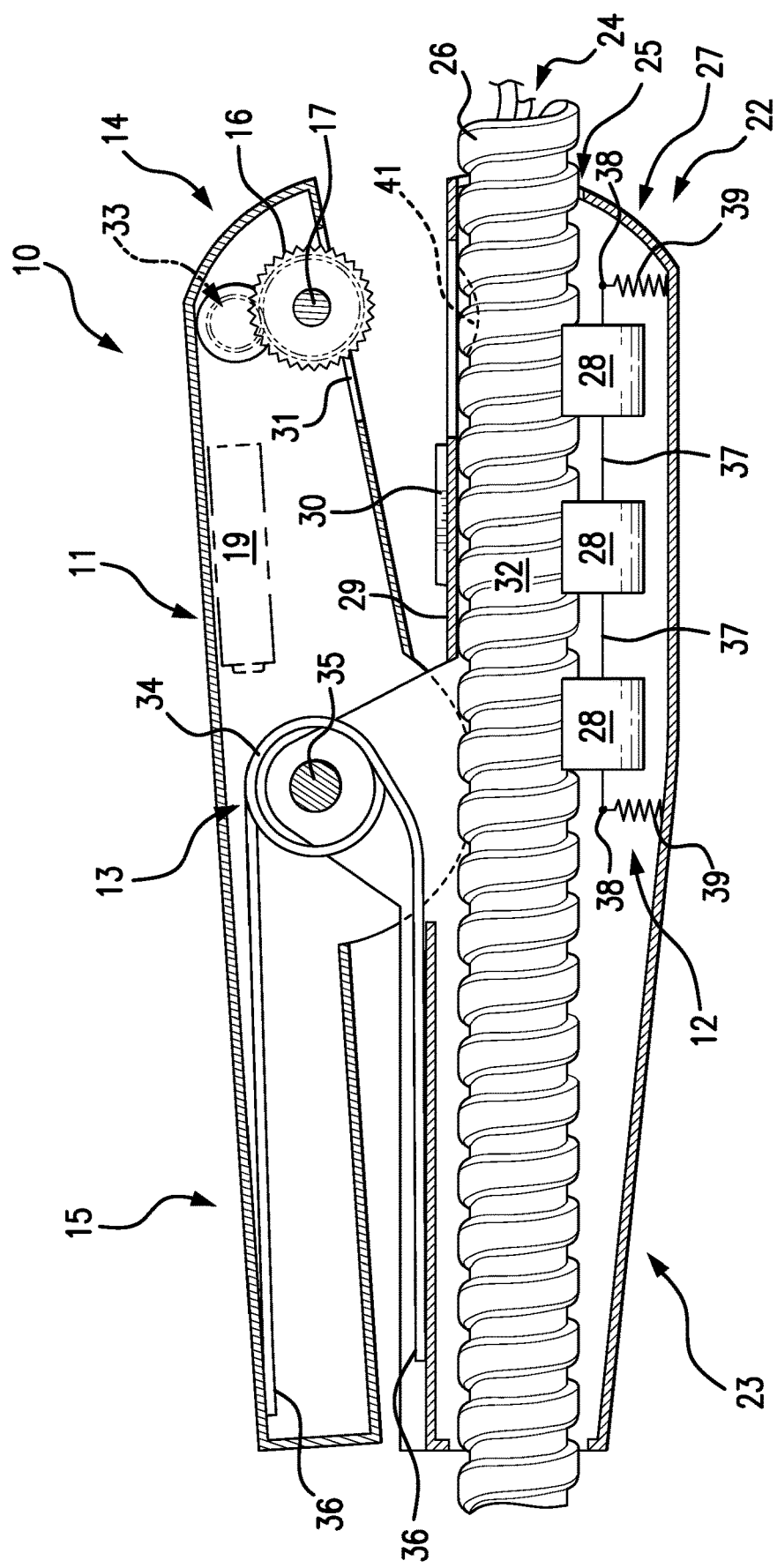
FIG. 4 is a side profile, partial cutaway view of the preferred embodiment of the present invention in the unclamped position.

Referring to FIGS. 1-4, the exemplary hand tool 10 for cutting metal cladding 32 of an electrical cable 26 comprises an upper cutting member 11 and a lower guide member 12, which is pivotally connected to the cutting member 11 by a spring-loaded hinge mechanism 13. The cutting member 11 comprises a proximal upper jaw 14 and a distal upper handle 15. The upper jaw 14 partially encloses a vertically oriented rotating circular saw blade 16, which is mounted on a blade shaft 15 driven, either directly or through a series of gears 33, by an electric motor 18. The motor 18 is electrically connected to a power source, preferably one or more batteries 19. An on-off switch 20 and a blade switch 21 control the power to activate and de-activate the motor 18, thereby starting or stopping the rotation of the saw blade 16. The saw blade 16 is replaceable, and the motor 18 is preferably low speed, high torque.

The guide member 12 comprises a proximal lower jaw 22 and a distal lower handle 23. The lower jaw 22 forms a cable channel 24, which has an upper cable guide 25 and a lower cable retainer 27. The cable 26 is inserted length-wise into the cable guide 25. The cable retainer 27 contains two longitudinal rows of spring-loaded cylindrical rollers 28, which engage the underside of the cable 26 and urge the cable 26 against the upper wall 29 of the cable guide 25.

In the absence of manual pressure on the upper handle 15 and lower handle 22, the spring-loaded hinge mechanism 13 urges the upper jaw 14 and the lower jaw 22 together, as limited by a stop structure 30, to a clamped jaw separation, which results in bringing the lower edge of the saw blade 16 into contact with the upper surface of the cable cladding 32.

While the on-off switch 20 is used to turn the overall power on and off, the blade switch 21 is closed when manual pressure is not applied to the two handles 15 22, so that the saw blade 16 is turning in contact with the cable cladding 32 at the clamped jaw separation 30. In this mode, best seen in FIGS. 2 and 3, the blade 16 protrudes through the longitudinal first slit 31 in the under surface of the upper jaw 14 and projects through an aligned longitudinal second slit 41 in the upper surface of the lower jaw 22, so as to engage and cut lengthwise the metal cladding 32 on the upper side of the cable 26.

When manual pressure is applied to the handles 15 23, the blade switch 21 is open, thereby stopping the blade rotation. In this mode, best seen in FIG. 4, the spring-loaded hinge mechanism 13 separates the upper and lower jaws 14 22, so as to enable a user of the tool to insert, manipulate and/or reposition the cable 26 in the cable guide 25 without interference from the saw blade 16.

Preferably, the hinge mechanism 13 has a torsional spring 34, which wraps around the hinge pivot 35. The torsional spring 34 has two free ends 36, which extend into the handles 15 23.

Preferably, each of the rows of cylindrical rollers 28 in the cable retainer 27 is interconnected by a rod 37, the ends of which 38 are connected to the base of the cable retainer 27 by coil springs 39, so as to urge the rollers 28 upward against the underside of the cable 26 in order to push the cable 26 against the upper wall 29 of the cable guide 25. Optionally, the rollers 28 can have a pliable outer layer or coating 40 to prevent pressure damage to the cable 26.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A hand tool for cutting metal cladding of an electrical cable, the tool comprising:
   an upper cutting member and a lower guide member, which are pivotally connected by a spring-loaded hinge mechanism;
   wherein the cutting member comprises a proximal upper jaw and a distal upper handle, and wherein the upper jaw partially encloses a vertically oriented rotating circular saw blade mounted on a blade shaft that is driven by an electric motor electrically connected to an electrical power source through an on-off switch and a blade switch;
   wherein the guide member comprises a proximal lower jaw and a distal lower handle, and wherein the lower jaw forms a cable channel, and wherein the cable channel has an upper cable guide, into which the electrical cable is longitudinally insertable, and wherein the cable channel has a lower cable retainer, comprising multiple pairs of longitudinally-oriented spring-loaded cylindrical rollers, which engage an underside of the electrical cable upon its insertion into the cable guide and compressively urge the electrical cable against an upper wall of the cable guide;
   wherein, in the absence of a manual compressive pressure on the upper handle and the lower handle, the spring-loaded hinge mechanism is configured to urge the upper jaw and the lower jaw together, to the extent of a clamped jaw separation imposed by a stop structure that is attached to either an under surface of the upper jaw or an upper surface the lower jaw;
   wherein, when both the on-off switch and the blade switch are closed, the electric motor is activated in the absence of the manual compressive pressure on the upper handle and the lower handle, and wherein, when the on-off switch is closed, upon application of the manual compressive pressure on the upper handle and the lower handle, the blade switch is open and the electric motor is deactivated;
   wherein, with the on-off switch closed and in the absence of the manual compressive pressure on the upper handle and the lower handle, the blade switch is closed, activating the electric motor, and the saw blade protrudes through a longitudinal first slit in an under surface of the upper jaw and projects through an aligned longitudinal second slit in an upper surface in the lower jaw, so as to longitudinally engage and cut the metal cladding on an upper side of the electrical cable inserted into the cable guide; and
   wherein, upon application of the manual compressive pressure on the upper handle and the lower handle, the blade switch is open, deactivating the electric motor, and the spring-loaded hinge mechanism is configured to separate the upper jaw and the lower jaw, to the extent of an unclamped jaw separation, at which the electrical cable is longitudinally insertable without engaging the saw blade, thereby enabling longitudinal insertion and removal of the electrical cable into and out of the cable guide.

2. The tool according to claim 1, wherein the blade shaft is connected to the electric motor either directly or through multiple gears.

3. The tool according to claim 2, wherein the electrical power source comprises one or more batteries.

4. The tool according to claim 3, wherein the spring-loaded hinge mechanism comprises a torsional spring wrapped around a hinge pivot, wherein the torsional spring has two free ends, one of which extends into the upper handle and one of which extends into the lower handle.

5. The tool according to claim 4, wherein the pairs of spring-loaded cylindrical rollers are aligned in two longitudinal roller rows, and wherein each roller row is interconnected by a rod having two terminal rod ends, and wherein each of the rod ends is connected to a base of the cable retainer by a coil spring, and wherein the coil springs urge the roller rows against the underside of the electrical cable upon its insertion into the cable guide and compressively urge the electrical cable against the upper wall of the cable guide.

6. The tool according to claim 3, wherein the pairs of spring-loaded cylindrical rollers are aligned in two longitudinal roller rows, and wherein each roller row is interconnected by a rod having two terminal rod ends, and wherein each of the rod ends is connected to a base of the cable retainer by a coil spring, and wherein the coil springs urge the roller rows against the underside of the electrical cable upon its insertion into the cable guide and compressively urge the electrical cable against the upper wall of the cable guide.

* * * * *